Patented May 7, 1946

2,399,694

UNITED STATES PATENT OFFICE 2,399,694

METHOD OF PREPARING A SULPHUR CONTAINING COMPOUNDING AGENT FOR RUBBER

Fritz S. Rostler, Heinz W. Sternberg, and Hubert I. du Pont, Wilmington, Del., assignors to Wilmington Chemical Corporation, Wilmington, Del., a corporation of Delaware No Drawing. Application December 19, 1942, Serial No. 469,570

4 Claims. (Cl. 106—274)

The present invention relates to an agent useful in the compounding of synthetic rubber.

Yet more specifically the present invention is concerned with the provision of a stable sulphur-carrying material having the property of facilitating the distribution of sulphur in synthetic rubber. Due to its high compatibility with synthetic rubber it may be readily compounded with those vulcanizable products which resist the dispersion of sulphur, particularly the present synthetic rubber-like materials of the Buna-N type. The product moreover contains sulphur in a form available for vulcanization. It has hitherto been almost universally the practice to add the necessary sulphur for hot vulcanization in powdered elemental form. Few organic liquids contain or are capable of holding sulphur in a condition available for the desired action upon the rubber. Few organic solvents have any substantial capacity for dissolving elemental sulphur. Moreover, the usual low boiling temperature of sulphur solvents renders it impossible to utilize them in a compounded mass under elevated temperatures. Among other things a solvent volatile at vulcanizing temperatures would expand, causing porosity in the vulcanizate.

It is now recognized that the uniform dispersion of elemental sulphur in the present day synthetic rubbers represents a serious problem of compounding. Where dispersion of the solid material is incomplete it has been found that the particles tend to agglomerate with the result that the final soft rubber resulting from vulvanization is non-uniform in properties and therefore seriously impaired in over-all characteristics. In particular this difficulty is characteristic of synthetic rubbers of the butadiene copolymer type and especially the so-called Buna-N rubbers, formed by the copolymerization of butadiene and acrylonitrile. At the same time a similar difficulty may be noted in the case of synthetic rubbers of other types which are not or are only difficulty plasticizable. This problem may be solved and the difficulty obviated where the sulphur is introduced in homogeneous dispersion within an organic carrier, as indicated in the copending application of Fritz Rostler, Serial No. 471,473, filed January 6, 1943.

The manufacture of sulphur-carrying organic preparations having fluent to plastic properties suitable for the present purpose is impeded by the necessity for observing many requisite factors. Thus, the proportion of sulphur carried in form available for reaction with the synthetic rubber must be sufficiently high with respect to the quantity of carrier which can be tolerated so as to completely satisfy the requirements of the vulcanizable constituents. Such a preparation moreover must be necessarily compatible with the synthetic rubber and preferably relatively fluent or plastic to permit ready compounding. Even an inert additive would necessarily, in any substantial proportion, normally tend to impair the character of the final material and it is therefore desirable that the carrier or organic solvent with which the sulphur is associated be adapted to form a useful, cooperative ingredient in the final vulcanizate.

It is an object of the present invention to provide an organic vulcanizing agent which is stable and which contains an adequately large proportion of sulphur available in a form suitable for active vulcanization.

It is yet a more specific object achieved by the present invention to provide a plastic and readily compatible preparation as above which, when employed in adequate proportion to effect vulcanization, does not impair the character of the final vulcanizate, and in fact has the property of co-vulcanization with the rubber, probably through a sulphur bridge linkage. In short, the non-sulphur components or portions of the preparation are not at all harmful to the final synthetic rubber and in fact form an advantageous addition from the standpoint of extending, bulking, plasticizing and/or otherwise enhancing the use of the compounded materials.

In accordance with the present invention there is employed a stable sulphur-containing preparation preferably formed from sulphur, and a largely unsaturated by-product of the petroleum industry having characteristics substantially identical with those of the products formed by neutralizing petroleum acid sludge and fractionating the organic constituents thereof under vacuum to eliminate at least the portions boiling below 160° C. and preferably outside the range from 160° to 360° C. at 12 mm. Hg.

It has hitherto been proposed, as seen, for example U. S. Patent 2,180,367, to employ such unsaturated materials as compounding agents for improving the properties of rubber. It has been observed that this substance is a solvent for elemental sulphur in relatively small concentrations normally below about 4 per cent. Such concentrations are, however, obviously inadequate to permit its use as a sulphur carrier in the compounding of synthetic rubber since the product itself is vulcanizable with from 3 to 6 per cent of the sulphur and even an excessive addition would normally be inadequate to satisfy the sulphur requirements of the mixture. While its capacity for dissolving sulphur increases somewhat at higher temperatures, separation tends to occur as soon as the temperature is lowered to normal. It is apparent that utilization of such preparations on an industrial scale is therefore impractical.

In accordance with the present invention it has been discovered, however, that the foregoing unsaturated product may be combined with sulphur to form stable preparations containing an adequate portion of fixed sulphur in concentrations, for example, approaching in some instances as high as 35 per cent, which preparations remain homogeneous and do not tend to separate or crystallize at atmospheric temperatures and which have advantageous properties enabling them to be readily compounded with synthetic rubbers in relatively large proportion.

In fact, highly advantageous commercial vulcanizates may be prepared from mixtures containing 25 to 50 per cent and higher of the unsaturated hydrocarbon without impairing the final synthetic rubber vulcanizate in any way. These preparations may be prepared within as wide a range of viscosity as desired, in accordance with the procedure observed during their preparation. They accordingly may be pre-selected in regard to viscosity so as to greatly facilitate compounding.

More specifically it has been discovered that valuable sulphur containing compositions as above may be prepared by reacting excess quantities of sulphur with the foregoing fractionated neutralized petroleum acid sludge products at temperatures substantially above the melting point of sulphur where H₂S is liberated and for a sufficient period of time to assure the formation of a stable reaction product. The reaction is advantageously and more expeditiously carried out above 160° C., for example at a temperature of 190° or 215° C. Lower temperatures may result in an excessively prolonged reaction period.

At the reaction temperature a plurality of chemical effects are noticed. Thus the components of the mixture apparently react progressively to form the desired stabilized product. Concurrently therewith liberation of sulphur takes place in the form of H₂S, presumably as the result of the foregoing reaction. It is particularly important to note that the relative extent to which sulphur is liberated by this latter effect affords a valuable index as to the extent to which the formation of a stabilized product is taking place in the reaction mixture. Conversely, the loss of sulphur as indicated by the sulphur content of the reacted product may be utilized as an indication of the extent to which the reaction has progressed.

More specifically attention is directed to the fact that the reaction is normally completed when at least about 7 per cent of sulphur, based on the final product, is lost from the reaction mixture. While this is an optimum figure which is advanced for illustrative purposes and which may be varied materially, nevertheless it represents what is probably a close approximation of completion of the reaction. The sulphur loss may be permitted to proceed to higher degree and to as great an extent as desired although at losses greater than 7 per cent no noticeable advantage ensues and the reaction product may assume an excessive increase in viscosity. The process may in some instances be terminated upon the disappearance of as little as about 5 per cent of sulphur based on the final product, although usually with some sacrifice in optimum properties. It is to be noted that the percentage of sulphur loss above is, for convenience, expressed on the basis of the final sulphur-hydrocarbon product.

The foregoing principles apply in general, irrespective of the amount of sulphur in the final reaction product. In other words, regardless of the proportion of sulphur originally added or fixed in stable form, the reaction is normally complete when the proportion of sulphur loss falls within the range heretofore stated. In this way stable homogeneous compositions containing as high as 35 per cent sulphur may be prepared. These result, for example, from reacting an admixture containing about 40 per cent sulphur and approximately 60 per cent of the sludge distillate at a sufficiently elevated temperature and for a sufficient period of time until loss of sulphur amounts to, at least, from 5 to 7 per cent by weight of the final product. The final preparations, having lower sulphur content, however, may be prepared and in fact are much more advantageous for commercial purposes. The range of utility seems to extend from 35 per cent of fixed sulphur substantially down to that proportion of sulphur which is normally soluble in the distillate at room temperature. In other words, the invention contemplates the preparation of products containing substantially above the 4 per cent sulphur normally soluble at room temperature and preferably above 5 per cent, although substantially higher concentrations ranging from 6 to 20 per cent fixed sulphur are to be preferred.

In general the viscosity of the final product, taken at 100° C. for convenience, is found to increase in approximate proportion to the percentage amount of sulphur lost by volatilization. This principle holds true regardless of the proportion of sulphur in the original unreacted mix or the amount of fixed sulphur remaining in the final stabilized product. In accordance with the teachings of the present invention, however, a substantial minimum viscosity increase, characterizes the fully stabilized products. In short, the viscosity increase advantageously amounts to at least about four times the viscosity of the starting material and in the case of the preferred unsaturated hydrocarbon distillate forming the optimum base material a final viscosity of at least about 100 centipoises is desirable. Usually a product having such viscosity characteristics results when the sulphur loss has been carried to the extent indicated above.

In view of the difficulty of specifically standardizing the product by controlling the reaction it is advisable to prepare products of a higher sulphur content and, if necessary, adjust them to the desired concentration by diluting back with some of the original distillate. The product is not at all impaired by such dilution and, starting with higher concentration of fixed sulphur, products containing 8, 10 and 15 per cent sulphur may be provided which are stable in storage and can be incorporated hot or cold into a rubber mixture.

The preferred organic carriers utilized in accordance with the present invention are high boiling materials composed essentially of hydrocarbons, as indicated by numerous analyses showing compositions approximating 90 per cent carbon and 10 per cent hydrogen. They are complex in structure, and weakly unsaturated, as indicated by low iodine numbers which are characteristically on the order of 20 to 60, and by high molecular weights which are usually from 300 to 1000. Their composition may be indicated empirically by the formula $(C_3H_4)_n$, with $n$ usually having a value in the range from 7 to 25. These unsaturated hydrocarbon materials are much more viscous than the normal petroleum oils from which they are separated during the refining treatment. They generally have the appearance of a reddish brown, greenly fluorescent oil, or of a slightly fluid resin. They thus form plastic materials which are readily compatible with synthetic rubber and apparently co-vulcanize with the synthetic rubber. In short it appears that the products during vulcanization become bound to the rubber molecule by bridge linkages over the sulphur atoms.

This unsaturated hydrocarbon material is also characterized by solubility in nearly all organic solvents, and by substantial solubility in strong sulphuric acids, including concentrated acid and fuming acid. It is generally not reactive with dilute reagents, but it reacts with many concentrated reagents. It is capable of an extensive reaction with sulphur, which is similar to caoutchouc vulcanization. It is also capable of nitration, and of polymerization and condensation with the ingredients of various types of synthetic resins.

As starting materials for the recovery of these mildly unsaturated hydrocarbons, there may be used the well-known acid sludges, which are formed in the refining of mineral oil products with sulphuric acid, or the residues obtained in the refining of mineral oil products with various selective solvents, including furfural, phenol, cresol, dichlor-diethyl ether, and mixtures of liquid $SO_2$ with various organic solvents including benzol. Useful procedures for production of the desired unsaturated hydrocarbon materials are disclosed in considerable detail elsewhere. For example, U. S. Patents Nos. 2,185,951, 2,185,952 and 2,217,918, as well as application, Serial No. 227,862, now U. S. Patent No. 2,247,411, describe various methods of obtaining the desired unsaturated hydrocarbon materials from acid sludges and from the residues of solvent refining. The hydrocarbons are also described in considerable detail, and claimed, in U. S. Patent 2,217,919. Briefly stated, these hydrocarbon materials are generally obtained by distillation under vacuum of solvent extract residues or the organic constituents of acid sludges or selected portions thereof. This distillation is generally effected in the presence of alkaline reagents or after thorough neutralization of the starting material with alkali, and the recovered material generally has a boiling range between 160° and 380° C. at an absolute pressure of 12 mm. Hg. Usually the material is recovered in fractions having narrower boiling ranges. For general use in accordance with the present invention the upper limit of boiling range is not particularly critical but it is advantageous to eliminate all fractions boiling below about 160° C. at 12 mm. Hg.

As will be apparent from the foregoing, the present invention contemplates, in accordance with its preferred embodiment, the sulphurization of certain unsaturated hydrocarbon distillates derived from the refining of mineral oil, and which are rendered suitable for the present purposes by elimination of certain fractions which tend to impair the utility of the final product for the present purposes. In short, the removal by distillation fractions boiling substantially below 160° C. at 12 mm. Hg as well as those preferably boiling above 380° C. contributes to the success of the final product for the purposes intended. On the other hand, it must be particularly noted that the invention in its broad aspect is not so limited. Many other hydrocarbons, and preferably bituminous products, are capable of being used with some success for the present purposes. Thus, for example, there are many relatively unsaturated petroleum products which may be treated in accordance with the principles of the present invention. Among these are petroleum oils resulting from cracking or those containing a naturally high content of unsaturates. Such products may include asphaltic petroleum products as well as bituminous products such as coal tar and related asphalts and the natural asphalts such as gilsonite. As is apparent from the foregoing, the invention thus contemplates the utilization of undistilled extracts as well as neutralized acid sludges of suitable viscosity and boiling point. Pine tar similarly has some utility in accordance with the present invention. In general these materials are suitable for treatment in accordance with the principles hereinabove enunciated, provided that they possess a boiling point substantially above 160° C. at 12 mm. Hg and contain a substantial proportion of unsaturated material. More specifically the boiling point should be considerably in excess of 160° C. at 12 mm. Hg and preferably above 180° or 190° C. at 12 mm. Hg. The requisite degree of unsaturation is indicated conveniently by solubility in sulfuric acid both concentrated and fuming. Hydrocarbon tars and asphalts of the required boiling point and soluble at least to the extent of 40 per cent in fuming sulfuric acid all seem to possess utility for the present purposes. It will be appreciated, however, in view of the principles stated above that a larger proportion of unsaturates is to be preferred, the foregoing representing an approximate minimum of the operative range of utility. Higher concentrations of unsaturated material are increasingly advantageous as are also higher boiling materials in so far as the final material can be incorporated in higher proportions to give an advantageous degree of fluidity for facilitating incorporation of other ingredients, such as powdered fillers, into the rubber mix. It has been found important that the hydrocarbon base used in the production of these sulphur preparations should consist mainly of unsaturated material but the unsaturation should not be too high because highly unsaturated products impart bad ageing properties and brittleness to the final vulcanizate. Compositions having an iodine number between 20 and 60 and preferably between 40 and 60 have been found most suitable and material of this kind can be incorporated into synthetic rubber compounds in very large amounts without impairing their physical properties or ageing characteristics. The most suitable source for these hydrocarbon materials are the above-described waste products of mineral oil refining.

It is thought pertinent to point out that various sulfurized materials have hitherto been proposed as extreme pressure and cutting oil ingredients for use in lubricating oils. It has been suggested to utilize starting materials comprising the extracts from solvent refining of mineral lubricating oils. In general, however, these products contain a low sulfur concentration, particularly in combination with the final oil and in no proposal with which we are aware is there any suggestion of producing products containing relatively high concentrations of fixed sulphur, in accordance with the principles enunciated above for the purpose of producing a product compatible and co-vulcanizable with synthetic rubber and wherein the sulphur is in the form available for satisfying the requirements of the vulcanizable components of the mix.

The following are a few specific examples, given for purposes of exemplifying optimum procedure in accordance with the present invention:

*Example 1.*—85 parts by weight of a distilled hydrocarbon material obtained from the neutralized acid sludge formed in the refining of mineral lubricating oil and having a boiling range of 250° to 360° C. at 12 mm. Hg were admixed with 15 parts of finely divided sulphur. The mixture was heated to 190° C. and held at this temperature for four hours. At the end of this period the product containing 9 per cent sulphur, available for vulcanization, was cooled. The sulphur content of the finished product as referred to the original mixture amounts to 8.4 parts. The loss accordingly was equal to 6.6 parts of the original mixture and thus equal to 7 per cent on the final product.

The product was a stable, homogeneous, readily flowing, plastic material having a viscosity of approximately 200 centipoises at 100° C. It may be diluted with sufficient proportion of the original unreacted hydrocarbon to bring the final admixture to a sulphur concentration of 6 or 8 per cent as desired, suitable as a sulphur carrier which is particularly advantageous in connection with the compounding of synthetic rubbers notably of the Buna-S and Buna-N type. Various other time and temperature relations may be resorted to in order to produce analogous products. Thus at a reaction temperature of 215° C. the foregoing mixture may result in a suitable preparation containing 8.6 per cent sulphur in 30 minutes. The product possesses a viscosity of 110 centipoises at 100° C. Additional heating results in somewhat of an increase in viscosity and a lowered final sulphur content.

At lower reaction temperatures, such for example as 180° C., longer time of treatment is required. Utilizing the starting mixture containing 15 per cent sulphur, six hours heating time is normally necessary and results in a product containing 8.8 per cent sulphur and having a viscosity of 186 centipoises at 100° C.

*Example 2.*—80 parts by weight of distilled hydrocarbon material derived from the solvent extract refining of mineral oil and having a boiling range of from 240° to 280° C. at 12 mm. Hg were mixed with 20 parts by weight of finely divided sulphur. The mixture was heated to 180–190° C. and held within this range for four hours. At the end of this time the reaction product had a sulphur content of 13 per cent, representing a sulphur loss of 8.8 per cent based on the final total composition.

Sufficient additional unreacted hydrocarbon distillate may be conveniently added to standardize the composition at a fixed sulphur content of 10 per cent. Advantageously the ingredients are warmed to about 140° C. to promote admixture. The resulting product is quite stable under all conditions of storage.

*Example 3.*—75 parts of an unsaturated hydrocarbon distillate as above are mixed with 25 parts of sulphur and heated to 215° C. for one hour. The resulting product is a stable product of particular utility in the compounding of Buna-N type rubber, having a sulphur content of 14.9 per cent.

Where the heating period is shortened to 30 minutes the product contains 17.6 per cent sulphur in fixed form. Prolonged heating for 6 hours results in a quite viscous material containing 8.2 per cent sulphur.

What we claim is:

1. A method of preparing a viscous liquid to plastic composition compatible with synthetic rubber and containing between 5 and about 35% sulphur based on the weight of the composition and in a form available for vulcanization, said composition being stable as to separation and crystallization of sulphur at atmospheric temperatures; comprising reacting an amount of sulphur at least 5% in excess of the sulphur desired in the final composition and an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining, said reaction utilizing a temperature substantially above the melting point of the sulphur and at which $H_2S$ is evolved from said reactive components, said reaction being carried out for a time not less than that necessary to volatilize at least 5% of the sulphur based on the weight of the composition.

2. A method of preparing a viscous liquid to plastic composition compatible with synthetic rubber and containing between 5 and about 35% sulphur based on the weight of the composition and in a form available for vulcanization, said composition being stable as to separation and crystallization of sulphur at atmospheric temperatures; comprising reacting an amount of sulphur at least 5% in excess of the sulphur desired in the final composition and an unsaturated hydrocarbon mass having approximately 90% of carbon and 10% of hydrogen and having a boiling point range of between about 190° C. and 360° C. at 12 mm. Hg, of the class consisting of components derived from the extract separated in the solvent refining of mineral oils and components separated by the distillation of neutralized acid sludge of petroleum oil refining, said reaction utilizing a temperature substantially above the melting point of the sulphur and at which $H_2S$ is evolved from said reactive components, said reaction being carried out for a time not less than that necessary to volatilize at least 5% of the sulphur based on the weight of the composition.

3. A viscous liquid to plastic composition compatible with synthetic rubbers and containing between 5 and about 35% sulphur based on the weight of the composition and in a form available for vulcanization, said composition being stable as to separation and crystallization of sulphur at atmospheric temperatures and having a viscosity in excess of 100 centipoises at 100° C., said composition comprising the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulphur equal to at least 5% in excess of the sulphur contained in the final composition, said reaction being carried out for a time not less than that necessary to volatilize at least 5% of the sulphur based on the weight of the composition.

4. A viscous liquid to plastic composition compatible with synthetic rubbers and containing between 5 and about 35% sulphur based on the weight of the composition and in a form available for vulcanization, said composition being stable as to separation and crystallization of sulphur at atmospheric temperatures and having a viscosity in excess of 100 centipoises at 100° C., said composition comprising the reaction product of an unsaturated hydrocarbon mass having approximately 90% of carbon and 10% of hydrogen, said unsaturated hydrocarbons having a boiling point range between about 190° C. and 360° C. at 12 mm. Hg, of the class consisting of components derived from the extract separated in the solvent refining of mineral oils and components separated by the distillation of neutralized acid sludge of petroleum oil refining, and an amount of sulphur equal to at least 5% in excess of the sulphur contained in the final composition, said reaction being carried out for a time not less than that necessary to volatilize at least 5% of the sulphur based on the weight of the composition.

FRITZ S. ROSTLER.
HEINZ W. STERNBERG.
HUBERT I. DU PONT.